May 5, 1942.　　　　F. B. LACHLE　　　　2,281,884
REFINING OF FATTY OILS
Filed June 7, 1939
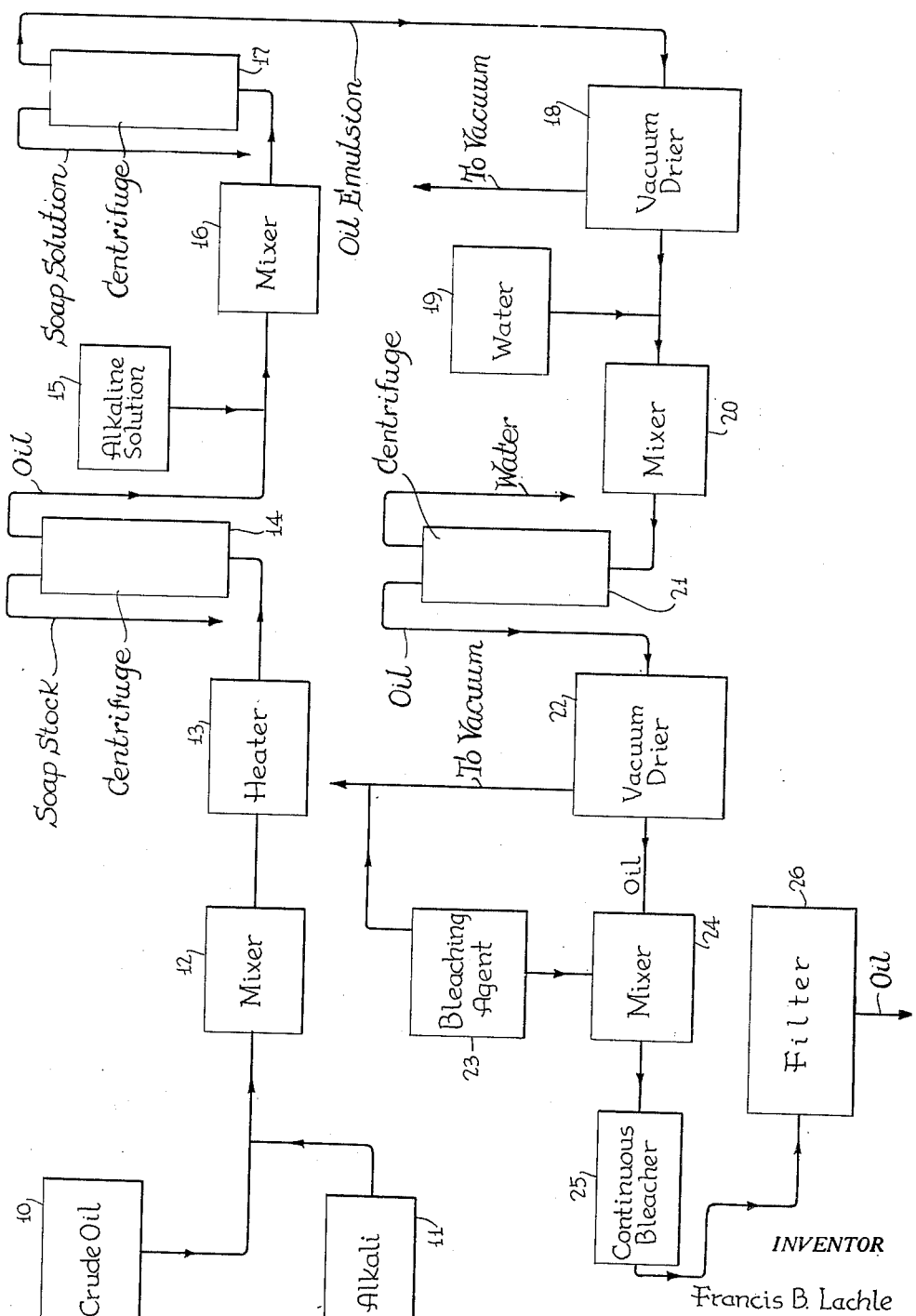
INVENTOR
Francis B. Lachle
BY Maurice A. Crews
ATTORNEY

UNITED STATES PATENT OFFICE 2,281,884

REFINING OF FATTY OILS

Francis B. Lachle, Philadelphia, Pa., assignor to
The Sharples Corporation, Philadelphia, Pa., a
corporation of Delaware Application June 7, 1939, Serial No. 277,749

12 Claims. (Cl. 260—425)

The present invention pertains to the refining of fatty oils, such as crude vegetable and animal oils. The invention relates primarily to a continuous process of refining fatty oils, although it is applicable in certain of its aspects to batch procedure, as will be evident from the following description. An object of the invention has been to improve the refining of fatty oils by providing a process in which such oils can be refined more efficiently; i. e., in which the yield of refined oil is higher than in previously known processes.

A second object of the invention has been to provide a process in which the color of the refined oil is improved as compared to previously known processes.

A further object of the invention has been to provide a process by which the refining operation is rendered more economical because of the fact that the total quantity of reagents employed in the process is reduced as compared to known processes. A still further object of the invention has been to provide a process which will produce an oil which is more stable than refined fatty oils obtained from prior art commerical refining processes.

A still further object of the invention is to provide a novel and improved process for re-refining fatty oils which have already been refined or partially refined.

A still further object of the invention has been to provide a process of treating refined fatty oils to stabilize them and render the subsequent bleaching treatment more efficient.

Other objects and advantages of the invention and the manner in which the above and these other objects are attained will be evident from a reading of the following detailed description, in the light of the attached flow sheet, in which the single figure represents an illustrative embodiment of the invention.

While the invention is applicable to the refining of the various vegetable and animal oils, as indicated above, it will be described first in connection with the refining of crude cotton seed oil. It is to be understood that this mode of description is employed solely for the purpose of simplicity of explanation of the process, and that the invention is applicable to the refining of various vegetable and animal oils, such as soya bean oil, corn oil, palm oil, palm kernel oil, babassu nut oil, oiticica oil, tallow, peanut oil, and other vegetable and animal oils, and that the invention is not to be limited to treatment of any particular fatty oil.

The crude cotton seed oil is first mixed with an alkaline reagent of appropriate concentration, such as the caustic soda solutions ordinarily used in cotton seed oil refining. This may be accomplished by passing the solution from container 11 through suitable proportioning apparatus, such as that illustrated in the U. S. patent to Jones 2,009,890, into confluence with a flowing stream of oil from container 10, and intensively mixing the alkaline solution and oil during passage through a continuous mixer 12 which may be of any desired type, such as a high speed mechanical mixer.

The mixture of oil and soap stock, formed by treatment of the oil with alkali as discussed above, may next be passed through a continuous heater 13, where it is preferably subjected to a temperature in excess of 115° F. in order to convert the mixture to a condition in which it may be more efficiently subjected to the ensuing step of centrifugation. The mixture is then passed directly from the heater 13 continuously through a centrifugal separator 14, which is preferably a machine of the type designed to effect continuous discharge of oil and soap stock as separate phases from the centrifugal rotor under liquid balance against each other, during continuous stratification of soap stock from oil in the centrifugal rotor.

The features of my improved process described above form no part of the present invention, since they constitute the subject matter of an invention by Edward M. James which is described and claimed in British Patent 407,995 and U. S. application #567,220, filed October 6, 1931. These features have been described for the reason that they constitute one preferred method of effecting a primary refining of the crude cotton seed oil which is thereafter subjected to treatment by the novel steps of the process of the present invention.

In order to effect improvement of oil discharged from the centrifugal 14, it is mixed with a further quantity of alkaline solution from the tank 15. This may be accomplished by continuously mixing a stream of flowing oil from the centrifugal 14 with the stream of aqueous solution, which is preferably continuously metered into the flowing stream of oil in desired proportions by metering apparatus of the type described and claimed in the patent to Jones No. 2,009,890. The oil and alkaline solution may then be mixed together in a continuous mixer 16 of similar character to the mixer 12. The alkaline solution from tank 15 is preferably very dilute, a solution of one-quarter normal (approximately 1% NaOH solution) sodium or potassium hydroxide affording excellent results, for reasons to be discussed hereinafter. Concentration of this solution may vary between ½ and 2%, however, and under certain modifications of the invention may be more dilute than ½%, or much more concentrated than 2%, as will be discussed hereinafter. For the present, we will assume that the solution is between ½ and 2% in concentration.

Alkaline solutions, which are very dilute and within the range of ½ to 2%, indicated above, when mixed with refined, or partially refined fatty oils, become emulsified in the oil much more finely than do solutions of higher or lower concentration, and the formation of a very fine emulsion of the alkaline solution in the oil at this stage of the process is desirable. Assuming that alkaline solution of approximately 1% concentration has been added to the oil, as above indicated, it is virtually impossible to remove all of the alkaline solution from the oil by immediate centrifugation or other means. The emulsion formed in the mixer 16 is passed to a centrifugal 17 which is similar to the centrifugal 14. A soap solution is discharged as the heavier phase from the centrifugal 17 and vegetable oil containing a small quantity of finely divided alkaline solution is discharged as the lighter phase. It is desirable that the oil discharged from the centrifugal 17 contain a small amount of caustic soda very finely dispersed throughout the body of the oil, and it is for this reason that a solution of approximately 1% of caustic soda is preferred, since, by the use of a solution of approximately this concentration, the alkali becomes so finely dispersed in the oil that the oil discharged from the centrifugal 17 will contain caustic soda finely dispersed throughout the oil.

The emulsion discharged from the centrifugal separator 17 is next passed through a vacuum drier 18. This vacuum drier removes a large part of the water in which the caustic soda dispersed in the oil is dissolved, thereby concentrating the caustic soda retained in the oil. Excellent results in the practice of the invention are obtained when the emulsion of caustic soda in oil is passed continuously through a vacuum drier 18 of the type described in U. S. Patent No. 2,068,971. By subjecting the emulsion to a vacuum drying operation at this stage, the caustic soda dispersed in the oil is changed from a very dilute solution to a very concentrated solution, and the concentrated alkali causes reactions with impurities in the oil which could not otherwise be obtained. Thus, this concentrated caustic soda solution reacts with further coloring matter of the oil and with other and oxidizable impurities in the oil to facilitate removal thereof by the next ensuing step of the process. Excellent results are obtained in cases in which the amount of caustic soda solution of approximately 1% concentration added to the oil from tank 15 amounts to between 8 and 15% of the quantity of refined oil discharged from the centrifugal 14 and treated with such solution, although the amount of alkaline solution added in this stage of the process depends largely upon the quantity of impurities still to be removed, and may vary widely (e. g. between 1 and 30%), depending upon the character of the oil being treated.

After the alkaline solution dispersed in the oil has been concentrated in the vacuum drier 18, as discussed above, the finely dispersed alkali is removed from the oil. This may be accomplished by mixing the oil discharged from the vacuum drier 18 with a quantity of water from tank 19, which is sufficient to wash residual caustic soda and associated impurities with which it has reacted, from the oil. This may be accomplished by the process described and claimed in the U. S. patent to James, 2,050,844. An amount of water amounting to approximately 10% of the weight of the oil under treatment, may, for example, be continuously mixed with the oil in a mixer 20 of the same type as mixers 13 and 16, and the wash water, with associated impurities, may then be removed from the oil by centrifugation in a centrifugal 21 of the same type as centrifugals 14 and 17. This step of water washing is preferably accomplished promptly after the oil leaves the vacuum drier 18, in order to avoid excessive reaction of the concentrated alkali upon the neutral oil. The oil discharged from the centrifugal 21 may next be passed through a vacuum drier 22, of similar character to vacuum drier 18, in order to remove the last traces of water.

By practicing the invention in accordance with the technique described above, we are able to remove a further part of the coloring matter in the oil discharged from the centrifugal 14, and bring it up to desired refined oil quality. As a consequence of the fact that the steps performed by elements 14 to 22 of the flow sheet effect removal of a part of the coloring matter of the oil, it is possible to effect the primary refining described in connection with elements 10 to 14 of the flow sheet with a smaller quantity of alkaline reagent than would otherwise be necessary. This use of a smaller quantity of alkaline reagent results in discharge of darker oil from the centrifugal 14 than would otherwise be obtained, but since the excess color contained in the oil so discharged is removed in the immediately ensuing steps of the continuous process, the discharge of darker oil from centrifugal 14 does not impair the general utility of the process.

The treatment with cuastic soda as described above, followed by concentration of the caustic soda by vacuum drying, results in removal from the oil of certain impurities which have heretofore been removed from oil conventionally by the ensuing bleaching treatment. As the result of this fact, it is possible to bleach the oil removed from the vacuum drier 22 with a considerably smaller proportion of bleaching agent than has heretofore been conventionally necessary, and it is possible to remove still further coloring matter and bring the oil up to a desired bleached oil color by continuous bleaching in cases in which such practice would be ineffective to produce the desired color improvement if the operations described in connection with numerals 15 to 22 of the flow sheet were not performed. As an alternative to bleaching oil from the drier 22 with clay, this oil may be bleached by the simple application of heat (preferably under vacuum) to produce oil of a desired bleached oil color, even in cases in which the heat bleaching process would not give satisfactory results if the particular crude oil were refined by other refining methods than those described above.

Further features of the invention relate to improved details of technique in connection with the bleaching operation itself. Bleaching agent from a container 23 is continuously introduced into the oil discharged from the vacuum drier. This bleaching agent may be any conventional material used for bleaching, such as a mixture of fuller's earth and activated carbon, or fuller's earth alone. The bleaching agent may be continuously mixed with the oil in a mixer 24 of the same type as the mixers 13, 16 and 20, and the mixture of oil and bleaching agent then passed through a continuous bleacher 25, which may be a simple agitated aging tank in which the bleaching agent is maintained suspended in the oil for a suitable period to cause the color bodies in the oil to be associated with the bleaching agent. The mixture of oil with the bleaching agent and associated color bodies is then passed through a filter 26 in order to remove the bleaching agent and associated color bodies from the oil.

Oil obtained by the practice of the steps of the invention is of better quality than oil obtained by prior art processes, in that it is more stable, since oxidizable impurities in the oil are removed by the features of the invention described in connection with numerals 15 to 22 of the flow sheet. Conventional bleaching agents cause a certain amount of oxidation of the oil being bleached. It is believed that the steps described in connection with the numerals 15 to 22 of the flow sheet remove a large part of the oxidizable impurities in the oil which have not heretofore been removed by any step in the refining and bleaching processes. If this theory is correct, the improvement in the quality of the finished oil may be attributed partially to the fact that such oxidizable impurities are not present in the oil when it is bleached in the practice of the present invention, and are therefore not subject to oxidation in the bleaching step.

A further feature of the invention consists in minimizing still further the oxidation of constituents of the oil in connection with the bleaching step, by conducting the bleaching operation in closed apparatus without permitting access of oxygen to the oil. In order to accomplish this result, the mixer 24, continuous bleacher 25 and filter 26 are preferably closed to prevent access of atmospheric oxygen to the oil during the bleaching treatment. In order to obtain still further improvement in this connection, the container 23 from which the bleaching agent is passed to the mixer 24 is preferably subjected to vacuum, as indicated at 27, to remove oxygen from the bleaching agent itself, and the conduit by which the bleaching agent is passed to the mixer 24 is also a closed conduit.

The temperature and other conditions to be observed in the practice of the process may vary within wide limits. For example, the oil may have a temperature varying between limits of 80 and 180° F. when it is treated with alkaline solution from the tank 10, mixed with the alkaline solution in the mixer 12, and subjected to centrifugation in the centrifugal 14. It may also vary within this same range of temperatures in connection with the addition of alkaline solution from the tank 15, and the ensuing step performed in the elements 17 and 18 of the flow sheet. Best results have been obtained in cases in which the oil was treated in accordance with the steps described in connection with numerals 13 to 18 of the flow sheet, at temperatures of approximately 140° F., since a relatively high temperature affords best results in connection with the separating steps. The oil may be heated to the desired temperature in the crude oil tank 10, it may be heated to such temperature in transit from the crude oil tank 10 to the mixer 12, it may be heated in transit from the tank 10 to the zone of admixture with the alkaline solution from tank 11, or the mixture of oil and soap stock may be heated in transit between the mixer 12 and centrifugal 14, as illustrated. It may also be heated in transit between any two of the elements indicated by the numerals 14 to 18 of the flow sheet.

A wide variation of temperatures is also possible in connection with the water washing step, but it is preferred that this washing step be accomplished at a temperature between 140 and 190° F., preferably at a temperature of approximately 160° F. If the temperature of the oil discharged from the vacuum drier is substantially lower than this temperature, it may be heated either in batch or in transit between the stage of vacuum drying in the drier 18 and the stage of mixing in the mixer 20.

As a still further alternative to any of the features described above with respect to temperature, the mixtures may be heated in any of the mixers 12, 16, 20 or 24.

In connection with the addition of alkaline solution from the tank 15 to the oil, and the ensuing steps by which a part of that alkaline solution is concentrated in the oil, modifications may also be adopted. Thus, it is possible to add alkaline solution from tank 15 which is much more concentrated or much more dilute than the alkaline solution of approximately 1% concentration described above. Such solutions will not become emulsified in the oil to the degree that the 1% solution becomes emulsified, but it is possible to adjust the centrifugal 17 in such a way as to discharge the bulk of the soap stock separately from the oil and to discharge a part of the alkaline solution with the oil, by appropriate choice of size of ring dams in the centrifugal 17. If this is done, the effect of discharging a part of the alkaline solution with the oil and the impact of the mixture against the covers of the centrifugal separator causes residual alkaline solution to be finely dispersed in the oil, and enables the subsequent step of concentration of finely dispersed alkaline solution to be accomplished as described above.

It is not even entirely necessary that the centrifugal 17 be employed, since it is possible to practice the invention by introducing a small amount of alkaline solution from the container 15, and concentrating this alkaline solution in the vacuum drier 18 without performing the intermediate step of centrifugation in the centrifuge 17. The use of centrifugal 17 is desirable, however, since a considerable part of the residual coloring matter in the oil is removed from the oil by this centrifuging step.

It is also possible to choose a strength of alkaline solution for addition from the tank 15, which is of such strength that it can be fairly thoroughly removed in the centrifugal 17, and discharge oil from the centrifuge 17 which contains practically no residual alkali. In such case, a small amount of alkali of appropriate concentration (preferably approximately 1% or between ½ and 2%) can be added to the oil discharged from the centrifugal 17, and this alkaline solution can then be intensely mixed with the oil, and concentrated in the vacuum drier 18, and the ensuing steps of the process practiced as described above.

In some instances, it may be desirable to omit the water washing and vacuum drying steps 19—22 entirely. In such case, oil containing soap, alkali and other impurities will be mixed with a filter aid (e. g. bleaching clay, kieselguhr or a suitable diatomaceous earth) after discharge from drier 18, and filtered to remove the impurities.

In the above discussion, the advantages obtained by concentration of a solution of sodium or potassium hydroxide having an initial concentration of between ½ and 2% have been particularly stressed. Thus, it has been pointed out that the concentration of such a solution while finely dispersed in the oil in the drier 18 affords considerable advantages from the standpoint of removal of impurities from the oil. The use of a sodium or potassium hydroxide solution of between ½ and 2% in the secondary refining operation has important advantages, however, even independently of the particular advantages obtained by concentrating such a solution after it has become finely dispersed in the oil. The fact that a solution having a concentration within this range becomes so very finely dispersed in the oil when agitated with the oil affords advantages in connection with the extensive degree of surface contact between aqueous reagent and oil obtained. For this reason, the advantages of the invention may be, to a large extent at least, attained by simply mixing aqueous reagent of concentration within the above limits with the oil, and thereafter removing the reagent from the oil by filtration with the aid of bleaching clay, kieselguhr or a suitable diatomaceous earth.

Still further modifications will be obvious to those skilled in the art. For example, the process has been described as a continuous one. It is possible to practice any or all of the steps of the process by batch operation instead of continuously. The removal of the alkaline solution of approximately 1% concentration may be accomplished by gravity settling, provided salt or appropriate other salting out agent is added to the mixture of oil and alkaline solution formed by addition of such alkali. While the features of the invention discussed in connection with numerals 10 to 14 of the flow sheet, with such possible modifications as have been described above, are particularly useful in connection with the features described in connection with numerals 15 to 22, and these features are in turn particularly valuable in connection with features described in connection with numerals 23 to 27, it will be evident that the features described in connection with numerals 15 to 22 are valuable in the re-refining of partially, or substantially completely, refined oil, regardless of whether that oil is obtained by the practice of the steps described in connection with numerals 10 to 14 or by some other sequences of steps. Thus, the treatment of the oil in connection with the steps described under numerals 15 to 22 may be practiced on oil refined by the conventional kettle process. These steps are useful in the treatment of oil which has been refined to produce a refined oil from the centrifugal 14 having an excellent refined oil color, since it is desirable to stabilize such oils and remove further oxidizing impurities therefrom, just as it is desirable to stabilize refined oils which are darker than the ultimately desired oil color, and to reduce their color further. Similarly, the steps of continuously bleaching the oil in a closed apparatus, and removing oxygen from the bleaching agent used in a continuous bleaching operation, such as that described in connection with numerals 23 to 27 of the drawing, are useful in the treatment of refined oil, whether that oil has been refined by any of the above-described steps or is obtained by entirely different sequences of refining operations.

Still further modifications will be obvious to those skilled in the art, and I do not therefore wish to be limited except by the scope of the subjoined claims.

I claim:

1. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with an aqueous alkaline solution and thereby effecting fine dispersion of said alkaline solution in the oil, thereafter subjecting the oil containing finely dispersed aqueous alkaline solution to vaccum evaporation to effect concentration of the finely dispersed alkaline solution, and thereafter removing impurities from the oil.

2. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with an aqueous alkaline solution and thereby effecting fine dispersion of said alkaline solution in the oil, thereafter subjecting the oil containing finely dispersed aqueous alkaline solution to vacuum evaporation to effect concentration of the finely dispersed alkaline solution, and thereafter removing impurities from the oil by mixing the oil with water and removing the water and associated impurities from the oil by subsidence.

3. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with an aqueous alkaline solution and thereby effecting fine dispersion of said alkaline solution in the oil, thereafter subjecting the oil containing finely dispersed aqueous alkaline solution to vacuum evaporation to effect concentration of the finely dispersed alkaline solution, and thereafter removing impurities from the oil by mixing the oil with water and removing the water and associated impurities from the oil by centrifugal subsidence.

4. In the refining of fatty oils, the process comprising continuously mixing a stream of alkaline solution with a flowing stream of oil in an amount sufficient to neutralize said oil substantially completely and to form soap stock, continuously passing the resulting mixture of oil and soap stock to a zone of centrifugation, promptly and continuously separating soap stock from the oil at said zone of centrifugation, thereafter stabilizing the oil and improving the color thereof by mixing said oil, from which said soap stock has been removed, with an aqueous alkaline solution and thereby effecting fine dispersion of said alkaline solution in the oil, thereafter subjecting the oil containing finely dispersed aqueous alkaline solution to vacuum evaporation to effect concentration of the finely dispersed alkaline solution, and thereafter removing impurities from the oil.

5. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with an aqueous alkaline solution of between ½ and 2% concentration and thereby effecting fine dispersion of said alkaline solution in the oil, thereafter separating a large proportion of the alkaline solution from the oil while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil.

6. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with an aqueous alkaline solution of between ½ and 2% concentration and thereby effecting fine dispersion of said alkaline solution in the oil, thereafter separating a large proportion of the alkaline solution from the oil by centrifugation while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil.

7. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with an aqueous alkaline solution of approximately 1% concentration and thereby effecting fine dispersion of said alkaline solution in the oil, thereafter separating a large proportion of the alkaline solution from the oil while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil.

8. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with between 8 and 15% of an aqueous alkaline solution of between ½ and 2% concentration and thereby effecting fine dispersion of said alkaline solution in the oil, thereafter separating a large proportion of the alkaline solution from the oil while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil.

9. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with between 8 and 15% of an aqueous alkaline solution of approximately 1% concentration and thereby effecting fine dispersion of said alkaline solution in the oil, thereafter separating a large proportion of the alkaline solution from the oil while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil.

10. In the refining of fatty oils, the process comprising mixing an alkali with the oil in an amount sufficient to neutralize said oil substantially completely and to form soap stock, separating soap stock formed as the result of said alakli treatment from the oil, thereafter stabilizing the oil and improving the color thereof by mixing said oil, from which said soap stock has been removed, with between 8 and 15% of an aqueous alkaline solution of approximately 1% concentration and thereby effecting fine dispersion of said alkaline solution in the oil, thereafter separating a large proportion of the alkaline solution from the oil by centrifugation while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil.

11. In the refining of fatty oils, the process comprising mixing an alkali with the oil in an amount sufficient to neutralize said oil substantially completely and to form soap stock, separating soap stock formed as the result of said alkali treatment from the oil, thereafter stabilizing the oil and improving the color thereof by mixing said oil, from which said soap stock has been removed, with between 8 and 15% of an aqueous alkaline solution of approximately 1% concentration and thereby effecting fine dispersion of said alkaline solution in the oil, thereafter separating a large proportion of the alkaline solution from the oil by centrifugation while retaining a substantial proportion thereof in the oil, thereafter subjecting the oil, while still containing a substantial proportion of finely dispersed aqueous alkaline solution, to vacuum evaporation to effect concentration of the finely dispersed alkaline solution, and thereafter removing impurities from the oil by mixing the oil with water and removing the water and associated impurities from the oil by centrifugal subsidence.

12. In the re-refining of fatty oils from which at least a substantial proportion of the fatty acids and coloring matter have already been removed by a primary refining operation, the steps comprising stabilizing the oil and improving the color thereof by mixing said oil to be re-refined with an aqueous alkaline solution chosen from the class consisting of sodium and potassium hydroxide solutions of between ½ and 2% concentration and thereby effecting fine dispersion of said alkaline solution in the oil, thereafter subjecting the oil containing finely dispersed aqueous alkaline solution to vacuum evaporation to effect concentration of the finely dispersed alkaline solution, and thereafter removing impurities from the oil.

FRANCIS B. LACHLE.